United States Patent
Lambert et al.

(10) Patent No.: US 8,732,283 B2
(45) Date of Patent: May 20, 2014

(54) MANAGEMENT OF NETWORK MEMBERSHIP

(75) Inventors: Paul A. Lambert, Mountain View, CA (US); Frank Huang, Pleasanton, CA (US)

(73) Assignee: Marvell International Ltd., Hamilton (BM)

( * ) Notice: Subject to any disclaimer, the term of this patent is extended or adjusted under 35 U.S.C. 154(b) by 286 days.

(21) Appl. No.: 13/269,486

(22) Filed: Oct. 7, 2011

(65) Prior Publication Data

US 2012/0096184 A1    Apr. 19, 2012

Related U.S. Application Data

(60) Provisional application No. 61/393,814, filed on Oct. 15, 2010, provisional application No. 61/405,574, filed on Oct. 21, 2010.

(51) Int. Cl.
  *G06F 15/177*    (2006.01)
(52) U.S. Cl.
  USPC .......................................... 709/221; 709/245
(58) Field of Classification Search
  USPC .................. 709/220, 221, 222, 223, 245
  See application file for complete search history.

(56) References Cited

U.S. PATENT DOCUMENTS

| | | | |
|---|---|---|---|
| 7,660,258 B2 * | 2/2010 | Cho et al. ....................... | 370/252 |
| 7,793,005 B1 | 9/2010 | Fernald et al. | |
| 8,006,276 B2 * | 8/2011 | Nakagawa et al. ........... | 725/105 |
| 8,036,520 B2 * | 10/2011 | Narukawa et al. ............. | 396/57 |
| 8,095,671 B2 * | 1/2012 | Balogh ......................... | 709/229 |
| 8,102,826 B2 * | 1/2012 | Lee ................................ | 370/338 |
| 8,364,831 B2 * | 1/2013 | Balogh ......................... | 709/229 |
| 8,392,850 B2 * | 3/2013 | Nakagawa et al. ........... | 715/838 |
| 8,451,862 B2 * | 5/2013 | Huang et al. .................. | 370/468 |
| 2001/0003191 A1 * | 6/2001 | Kovacs et al. ................. | 709/226 |
| 2004/0240474 A1 * | 12/2004 | Fan ................................ | 370/475 |
| 2005/0188069 A1 * | 8/2005 | Mohandas .................... | 709/223 |
| 2006/0256717 A1 | 11/2006 | Caci | |
| 2007/0204021 A1 * | 8/2007 | Ekl et al. ........................ | 709/223 |
| 2010/0054154 A1 | 3/2010 | Lambert et al. | |
| 2010/0067509 A1 | 3/2010 | Lambert | |

FOREIGN PATENT DOCUMENTS

WO    2010083887    7/2010

OTHER PUBLICATIONS

Chen et al., "Scalable Address Allocation Protocol for Mobile Ad Hoc Networks," 2009, Fifth International Conference on Mobile Ad-hoc and Sensor Networks, IEEE Computer Society, 41-48, 8 pages.

Johnson, et al., "Subnet Allocation Option" Internet Engineering Task Force, Internet Society (ISOC), May 13, 2010, pp. 1-30.

(Continued)

*Primary Examiner* — Sargon Nano

(57) ABSTRACT

A method includes, at a first device of a first portion of an ad hoc network, receiving, from a second device of a second portion of the ad hoc network, information relating to a second set of addresses of the ad hoc network locally stored at the second device, the first and second portions of the ad hoc network having been disconnected prior to receiving the information about the second set of addresses; determining that the second set of addresses is different from a first set of addresses locally stored at the first device; requesting from the second device the second set of addresses; receiving a response from the second device including the second set of addresses; and generating a set of addresses of the coalesced first and second portions of the ad hoc network as a reunion of the first and second sets of addresses.

16 Claims, 9 Drawing Sheets

(56) References Cited

OTHER PUBLICATIONS

Mobsin et al., "IP address assignment in a mobile ad hoc network", IEEE Military Communications Conference, Oct. 7, 2002, pp. 856-861.

Rummery, Audrey, Authorized Officer, European Patent Office, International Search Report for related PCT Application No. PCT/US2011/055476, Apr. 2, 2012, 12 pages.

IBSS with Wi-Fi Protected Setup Technical Specification v.1.0.0, Wi-Fi Alliance Technical Committee IBSS with Wi-Fi Protected Setup Technical Task Group, 2012, 76 pages.

* cited by examiner

MANAGEMENT OF NETWORK MEMBERSHIP

CROSS REFERENCE TO RELATED APPLICATION

This disclosure claims the benefit of the priority of U.S. Provisional Application No. 61/393,814, filed on Oct. 15, 2010, and of U.S. Provisional Application No. 61/405,574, filed on Oct. 21, 2010, both of which are incorporated herein by reference in their entirety.

BACKGROUND

The present disclosure describes technologies relating generally to management of network membership, and more specifically to management of membership in mobile, wireless ad hoc networks.

Two or more mobile devices can communicate with each other as wireless clients of a wireless network. Examples of such mobile devices are laptop or tablet computers, smartphones, personal digital assistants (PDAs), digital cameras, child monitoring devices, and the like. A wireless network is said to operate in infrastructure mode if communications of the two or more wireless clients are bridged through a wireless access point. The wireless network is said to operate in ad hoc mode if the two or more mobile devices communicate with each other directly, without the use of a wireless access point. The ad hoc mode is also commonly referred to as a wireless peer-to-peer (P2P) mode. Wireless clients in ad hoc mode form an independent basic service set (IBSS). In this specification, a wireless network operating in ad hoc mode and including mobile devices is referred to, interchangeably, as an ad hoc network, an IBSS network, or a wireless P2P network.

In some IBSS networks, one of the wireless clients, e.g., a mobile device that was the first wireless member in a given IBSS network, can periodically beacon to identify the given IBSS network, and can authenticate new members. Hence, this wireless client acts as a Dynamic Host Configuration Protocol (DHCP) server that assigns addresses to the new members, such that the assigned addresses are not conflicting. To join the given IBSS network, a mobile device would locate the wireless client that acts as the DHCP server to obtain an address on the given IBSS network.

In other IBSS networks known as zero configuration networks, to join the network a mobile device selects a candidate address, e.g., an address within a reserved range of addresses, and uses Address Resolution Protocol (ARP) probes to ascertain that the candidate address is not currently in use on the network. The addressing approach used in zero configuration networks is also referred to as link-local addressing, and requires multicast transmissions that should, ideally, reach all members of the IBSS network. Should a mobile device joining a zero configuration network determine that a selected candidate address is already in use within the zero configuration network, a new address is selected.

SUMMARY

The present disclosure describes systems and techniques for managing network membership, e.g., for assigning addresses and managing the assigned addresses in ad hoc networks.

According to an aspect of the present disclosure, a method includes receiving, at a first device that is part of a first portion of an ad hoc network from a second device that is part of a second portion of the ad hoc network, information relating to a second set of addresses associated with the ad hoc network. The second set of addresses is locally stored at the second device, and the first and second portions of the ad hoc network have been disconnected prior to receiving the information relating to the second set of addresses. Further, the method includes determining that the second set of addresses is different from a first set of addresses associated with the ad hoc network. The first set of addresses is locally stored at the first device. Furthermore, the method includes requesting the second set of addresses from the second device, in response to the determination. Also, the method includes receiving a response from the second device including the second set of addresses, and generating a set of addresses associated with the coalesced first and second portions of the ad hoc network as a reunion of the first and second sets of addresses.

Implementations can include one or more of the following features. In some implementations, the ad hoc network can be a mobile, wireless ad hoc network. In such implementations, the method can include beaconing information relating to the set of addresses associated with the coalesced first and second portions of the ad hoc network. Moreover, the information relating to the second set of addresses can be received by the first device via a beacon carrying the information that was emitted by the second device.

In some implementations, the method can include determining, from the first set of addresses by the first device that is part of the first portion of the ad hoc network, a subset of addresses that are not locally stored at the second device. In addition, the method can include determining, from the second set of addresses, a subset of addresses that are not locally stored at the first device. Also, the method can include transmitting, to the second device, the subset of addresses from the locally stored first set of addresses that are not locally stored at the second device, and transmitting, to other devices of the first portion of the ad hoc network, the subset of addresses from the second set of addresses that are not locally stored at the first device. In some implementations, the method can include determining, by the first device that is part of the first portion of the ad hoc network, a conflicting address belonging to a third device of the first portion of the ad hoc network, and to a fourth device of the second portion of the ad hoc network. Further, the method can include assigning a new address to the third device, in response to determining the conflicting address. Additionally, the method can include notifying the other devices of the first portion of the ad hoc network of the newly assigned address of the third device.

In some implementations, the method can include receiving, by a given device that is a member of the ad hoc network, a request to join the ad hoc network from a device that is not a member of the ad hoc network. Further, the method can include transmitting to the requesting device a locally stored set of addresses associated with the ad hoc network. Furthermore, the method can include obtaining an address for the requesting device to be different from any address of the locally stored set of addresses, and notifying other devices associated with the ad hoc network about the address of the newest device associated with the ad hoc network. For example, obtaining the address for the requesting device can include assigning an address for the requesting device. In this case, the method can further include transmitting the assigned address to the requesting device. As another example, obtaining the address for the requesting device can include receiving, from the requesting device, a self-assigned address.

In another aspect of the present disclosure, a device includes one or more hardware processors, and a memory storing instructions that when executed cause the one or more hardware processors to perform operations including communicating with one or more members of an ad hoc network that includes the device. For example, the device can be a mobile device, and the ad hoc network can be a mobile, wireless ad hoc network. The operations further include storing a set of addresses associated with the one or more members of the ad hoc network. Furthermore, the operations include receiving a request to join the ad hoc network from a device that is not a member of the ad hoc network, and assigning an address for the requesting device that is different from any address of the stored set of addresses. The assigned address represents the requesting device's address as a new member of the ad hoc network. Also, the operations include transmitting to the requesting device a response including the assigned address and the stored set of addresses, and notifying the one or more members of the ad hoc network about the address of the newest member of the ad hoc network.

Implementations can include one or more of the following features. In some implementations, the operations can include receiving, from another device that is a member of the ad hoc network, information relating to another set of addresses associated with the ad hoc network. The other set of addresses can be locally stored at the other device. The operations can also include detecting that the other set of addresses is different from the locally stored set of addresses associated with the ad hoc network. Further, the operations can include, in response to the detection, determining that a first portion of the ad hoc network to which the device belongs has been disconnected, prior to receiving the information relating to the other set of addresses, from a second portion of the ad hoc network to which the other device belongs, and requesting from the other device the other set of addresses. Furthermore, the operations can include receiving a response from the other device including the other set of addresses, and generating a set of addresses associated with the coalesced first and second portions of the ad hoc network as a reunion of the first and second sets of addresses.

In some implementations, the operations can include determining, from the set of addresses, a subset of addresses that are not locally stored at the other device, and determining, from the other set of addresses, a subset of addresses that are not locally stored at the device. Also, the operations can include transmitting, to the other device, the subset of addresses from the locally stored set of addresses that are not locally stored at the other device, and transmitting, to other devices of the first portion of the ad hoc network, the subset of addresses from the other set of addresses that are not locally stored at the device. In some implementations, the operations can include determining a conflicting address belonging to a first device of the first portion of the ad hoc network, and to a second device of the second portion of the ad hoc network. Further, the method can include, in response to determining the conflicting address, assigning a new address to the first device, and notifying the other devices of the first portion of the ad hoc network of the newly assigned address of the first device.

In another aspect of the present disclosure, a method includes transmitting, by a device that is not a member of an ad hoc network, a request to join the ad hoc network to a given device of the ad hoc network. The method also includes receiving from the given device information including a set of addresses of devices of the ad hoc network that is locally stored at the given device. In addition, the method includes obtaining an address for the requesting device to be different from any address of the receive set of addresses.

Implementations can include one or more of the following features. In some implementations, obtaining the address for the requesting device can include self-assigning an address, and in such case, the method can include transmitting the self-assigned address to the given device of the ad hoc network. In other implementations, obtaining the address for the requesting device includes receiving from the given device of the ad hoc network the address assigned by the given device of the ad hoc network. In addition, the information received from the given device further can include security configuration information corresponding to the set of addresses received from the given device. Moreover, each one of the set of addresses received from the given device can include an IP address of a corresponding device of the ad hoc network. Additionally, each one of the set of addresses received from the given device further can include a MAC address of the corresponding device of the ad hoc network.

In some implementations, the method can include randomly selecting, by the requesting device, the given device of the ad hoc network from which to request to join the ad hoc network. In some implementations, the method can include selecting, by the requesting device based on predefined criteria, the given device of the ad hoc network from which to request to join the ad hoc network.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor, a central processing unit, etc.) to perform operations described. Thus, program implementations can be realized from a disclosed method, system, or apparatus and apparatus implementations can be realized from a disclosed system, computer-readable medium, or method. Similarly, method implementations can be realized from a disclosed system, computer-readable medium, or apparatus and system implementations can be realized from a disclosed method, computer-readable medium, or apparatus. For example, one or more disclosed implementations can be configured in various systems and apparatus, including, but not limited to, mobile data processing apparatuses (e.g., wireless clients, cellular telephones, smartphones, PDAs, mobile computers, digital cameras), or combinations of these.

Implementations of the subject matter described in this specification can be configured so as to realize one or more of the following potential advantages. Devices that use the disclosed systems and techniques to join a wireless, mobile ad hoc network can learn the addresses of N members of the ad hoc network as a result of a single communication with a randomly encountered or selected member from among the N members, without having to conduct an N-ways multicast to reach all of the N members. In this fashion, information relating to the N members is provided to the new member whether the N members are available, asleep or detached at the time the requesting mobile device attempts to join the network.

In addition, the devices that use the technologies described in this specification to join a secure wireless mobile ad hoc network can receive along with the set of addresses associated with N mobile devices of the ad hoc network, security information corresponding to the N mobile devices. In this fashion, the new members can start secure communications with the N members of the secure ad hoc network as a result of a single communication with a randomly encountered or selected member from among the N members, without having to complete N-by-M handshakes, e.g., M=4 handshakes for each of the N members in accordance with the Wi-Fi Protected Access (WPA) protocol.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

Figure 1:
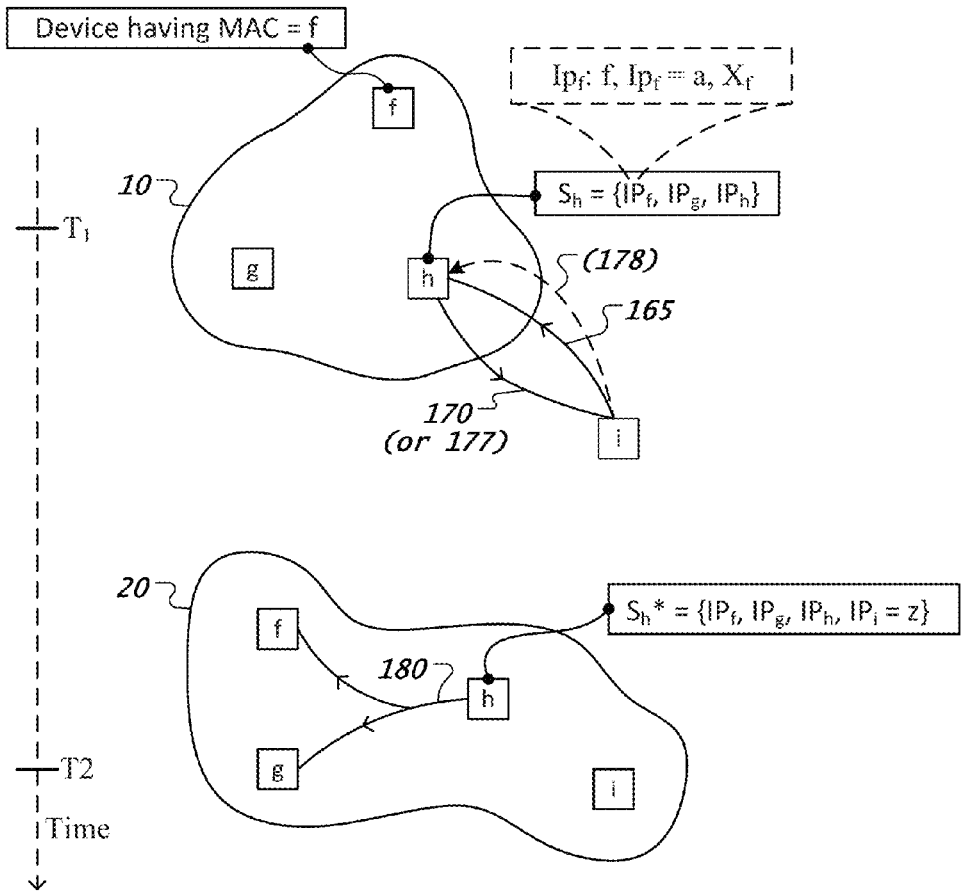
FIG. 1 shows aspects of technology used to enroll a mobile device as a member in an ad hoc network.

FIG. 1 shows aspects of technology used to enroll a device as a member in an ad hoc network. The device can be a mobile device, and the ad hoc network can be a mobile wireless ad hoc network, e.g., an IBSS network. To become a member of the ad hoc network, the device obtains an address associated with the ad hoc network. The address of the device is associated with the ad hoc network either (i) if the address is assigned by a network member to the device, or (ii) if the address of the device is self-assigned and communicated to at least one network member.

For example, a group of classmates go to a stadium. They take pictures and notes using cell phones with camera functionality and input functionality. As each member of the group would like to share the pictures and notes only with other classmates, they establish a secured ad hoc network, e.g., by using personal identification number (PIN) validation. The systems and techniques described below in connection with FIGS. 1-3 can be used to enroll a mobile device that belongs to a classmate who wishes to join the established secured ad hoc network at a later time.

At a time T1, a mobile device "i" from outside a mobile, wireless ad hoc network requests to join a first instance 10 of the ad hoc network. Each one of the network members "f", "g" and "h" is a mobile device that can communicate as a peer with any one of the other network members. In addition, any one of network members "f", "g" and "h" can wirelessly communicate with the mobile device "i" to register the latter in the ad hoc network. Moreover, the mobile device "i" can randomly select one of the network members "f", "g" and "h" from which to request to enroll in the ad hoc network. Alternatively, the mobile device "i" can request to enroll in the ad hoc network from one of the network members "f", "g" and "h" that was selected based on a predefined criterion, as described below in this specification. At a later time T2, a second instance 20 of the ad hoc network includes the mobile device "i" as a network member.

Examples of mobile devices that can be members of the ad hoc network illustrated in FIG. 1 are cellular telephones, smartphones, PDAs, mobile computers, digital cameras, media players or combinations of these. Structural and functional components of mobile devices that can be members of ad hoc networks are described below in this specification in connection with FIG. 9.

An identifier of a mobile device, whether or not the mobile device is a member of the ad hoc network, can be a media access control (MAC) address associated with the mobile device. For example, the mobile device "h" has a MAC address=h; the mobile device "i" has a MAC address=i; etc. In addition, each of the mobile devices "f", "g" and "h" that are members of the ad hoc network has an associated internet protocol (IP) address. For example, mobile device "f" has an IP address that is denoted $IP_f$. The value of the IP address for device "f" is $IP_f$=a. As another example, mobile device "g" has $IP_g$=b, and mobile device "h" has $IP_h$=c. At the time T1, the mobile device "i" does not have an IP address because it is not a member of the instance 10 of the ad hoc network. However, the mobile device "i" acquires an IP address IPi=z at a later time T2, when it becomes a member of the other instance 20 of the ad hoc network. In some IBSS networks that support the internet protocol version 6 (IPv6), the IP addresses IPf, IPg, IPh, IPi can be assigned in accordance with IPv6. In other IBSS networks that support the internet protocol version 4 (IPv4), the IP addresses IPf, IPg, IPh, IPi can be assigned in accordance with IPv4, using a modified Wi-Fi simple configuration (WSC) protocol, as described below in this specification.

Before the time T1, the mobile device "i" can detect the instance 10 of the ad hoc network. As part of this detection, the mobile device "i" can determine that any one of the network members "f", "g" and "h" can act as a registrar to enroll the mobile device "i" into the ad hoc network. The enrollee device "i" can then select one of the network members "f", "g" and "h" with which to communicate about joining the ad hoc network. In some implementations, the enrollee device "i" can randomly select the registrar network member. In other implementations, the selection of the registrar network member by the enrollee device "i" can be based on predefined criteria. One such selection criterion can be an order in which the enrollee device "i" discovers the network members. For example, the network member chosen by the enrollee device "i" to be the registrar is the network member that was discovered first. Another such selection criterion can be strength of signals received from the network members by the enrollee device "i". For example, the network member chosen by the enrollee device "i" to be the registrar is the network member associated with the strongest signal received by the enrollee device "i" from among signals emitted by the network members "f", "g" and "h".

Once the enrollee device "i" has selected the registrar network member, e.g., network member "h", the enrollee device "i" can communicate with the selected registrar "h" to enroll in the ad hoc network. The enrollment communication can begin at the time T1 when the enrollee device "i" transmits a request 165 to the registrar network member "h" to join the instance 10 of the ad hoc network.

In some implementations, the registrar network member "h" can respond to the enrollee device "i" with a response 177. The information contained in the response 177 can include a set of addresses Sh corresponding to the members of the instance 10 of the ad hoc network known by the network member "h". Additionally, the set of addresses Sh is locally stored at the network member "h". In the examples illustrated in FIG. 1, the set of addresses is Sh={IPf, IPg, IPh}. Each of the elements of the set of addresses Sh (e.g., address IPf) is associated with a corresponding device (e.g., device "f"). For example, an address IPf can include a pair of values (f, a) that represents a mapping between a MAC address=f associated with the device "f" and an IP address value IPf=a associated with the device "f". As another example, the address IPf can include a triplet of values (f, a, Xf) that represents a mapping between the MAC address=f associated with the device "f", the IP address value IPf=a associated with the device "f", and security credentials Xf associated with the device "f". In general, the security credentials Xf correspond to security initialization values. In some instances, the security credentials Xf associated with the device "f" can include a public key. In other instances, the security credentials Xf can be a private key corresponding, e.g., to a shared broadcast key used by the members of the ad hoc network. In some other instances, the security credentials can be a device-unique nonce (e.g., a random or pseudo-random number) used to create/calculate a pairwise transient key for secured communication between two members of the ad hoc network.

Further in these implementations, the enrollee device "i" can self-assign an address IPi, based on the set of addresses Sh received from the selected registrar member "h" of the ad hoc network. For example, the address IPi is self-assigned to have a value IPi=z that is different from the values of the IP addresses in the set of addresses Sh received from the selected registrar member "h". Once the enrollee device "i" has self-assigned the address IPi, the enrollee device "i" can transmit a notification 178 including the self-assigned address IPi to the registrar member "h". In this fashion, at the time T2, the enrollee device "i" can become a new member of the ad hoc network, because the mobile device "i" now has an address IPi that is known by at least another member of the ad hoc network, in this case by the selected registrar member "h" which received the notification 178.

In other implementations, in response to the request 165 received from the enrollee device "i", the selected registrar network member "h" can assign an address IPi for the enrollee device "i". The address IPi for the enrollee device is generated by the selected registrar member "h" to have a value IPi=z that is different from the values of the other IP addresses in the locally stored set of addresses Sh. In these implementations, the information contained in the response 170 can include, in addition to the locally stored set of addresses Sh={IPf, IPg, IPh}, a value of the IP address IPi=z generated by the selected registrar member "h" for the enrollee device "i". Upon receipt of the response 170, at the time T2, the enrollee device "i" can become a new member of the ad hoc network, because the mobile device "i" has acquired an address IPi that is known by at least another member of the ad hoc network, in this case by the selected registrar member "h" which assigned the address IPi.

In either of the implementations described above, the selected registrar member "h" can update the locally stored set of addresses Sh corresponding to the instance 10 of the ad hoc network prior to the device "i" joining the ad hoc network. The updated locally stored set Sh*={IPf, IPg, IPh, IPi=z} corresponds to a current instance 20 of the ad hoc network that includes the new network member "i" having the address IPi. Moreover, the selected registrar member "h" can multicast, to the other network members "f" and "g", a notification 180 that includes the address IPi of the new network member "i". In this fashion, the updated set of addresses Sh* (and the associated security information) that is locally stored at the selected registrar member "h" can be propagated to at least the network members accessible to the selected registrar member "h" (e.g., network members that are online, in communication range with the network member "h", etc.)

The technologies described above in this specification enable the network members "f", "g", "h" and "i" of the instance 20 of the ad hoc network to gain knowledge of a most current membership state of the ad hoc network. Consequently, upon joining the ad hoc network at the time T2, the new network member "i" can promptly initiate communications (and if necessary secure communications) with any of the network members having the IP addresses and associated security information included in the updated set of addresses Sh*. Moreover, the technologies described above may allow for membership conflicts to occur. For instance, network members "f" and "h" may concurrently assign the same IP address to two new members "i" and "j" that are joining the instance 10 of the ad hoc network through registrars "f" and "h", respectively, at the same time. This and other types of membership conflicts can be addressed in accordance with conflict resolution processes described below in this specification in connection with FIGS. 7 and 8.

Figure 2:
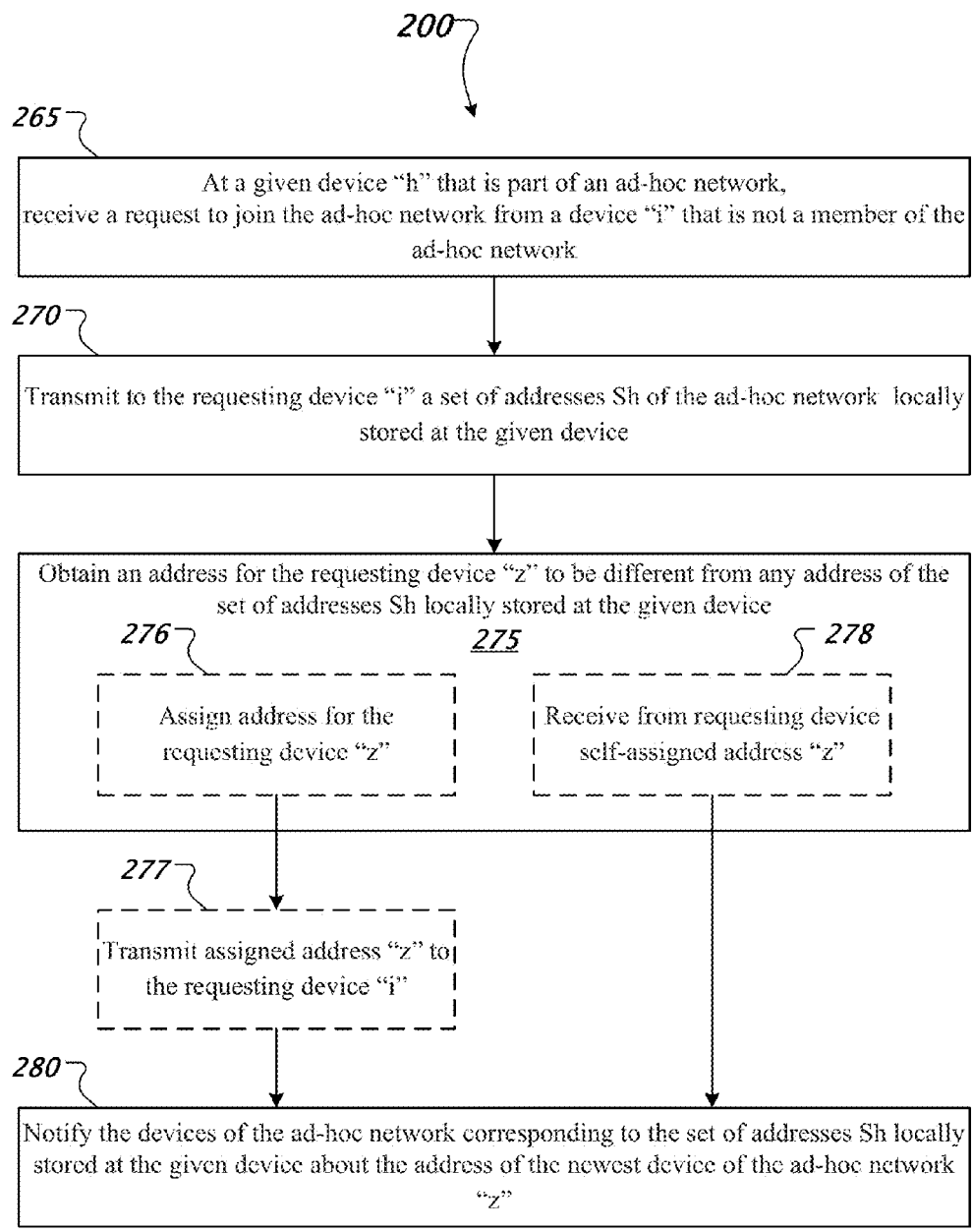
FIG. 2 shows an example of a process used by a member of an ad hoc network to register a new device as a member to the ad hoc network.

FIG. 2 shows an example of a process 200 used by a member of an ad hoc network to register a new device to the ad hoc network. In the examples illustrated in FIG. 1, the process 200 can be performed by a network member "h" that is selected by an enrollee device "i" to act as a registrar for the mobile, wireless ad hoc network.

At 265, a request to join the ad hoc network is received by a given device that is a member of the ad hoc network from a device that is not a member of the ad hoc network. In the examples illustrated in FIG. 1, the network member "h" can detect a signal emitted by the mobile device "i" to indicate that the latter requests to enroll in the instance 10 of the ad hoc network. The received request can trigger initiation, by the network member "h", of a registration process for the enrollee device "i".

At 270, the given network member transmits to the requesting device a locally stored set of addresses of the ad hoc network known by the given network member. Each one of the members of the mobile, wireless ad hoc network can be configured to locally store, in persistent storage (e.g., flash memory, solid-state drive, hard drive, and the like,) the set of addresses of the ad hoc network known by the one network member. Such stored membership information can be updated via communications with other peer members. In the examples illustrated in FIG. 1, the registrar member "h" can transmit to the enrollee device "i" membership information for the ad hoc network. The transmitted membership information can include a locally stored set Sh={IPf, IPg, IPh} of IP addresses associated with the mobile devices that are known by the registrar member "h" to be members of the instance 10 of the ad hoc network. Each one of the IP addresses in the set Sh corresponds to a mapping of a MAC address associated with one network member and an IP address value associated with the one network member. Further, each one of the elements in the set of addresses Sh also can correspond to a mapping of a combination MAC and IP address associated with one of the network members to security configuration information.

At 275, the given network member obtains an address for the requesting device to be different from any address of the set of addresses known by the given network member. The obtained address represents an IP address that will be used by the requesting device once it becomes a member of the ad hoc network. In the examples illustrated in FIG. 1, the registrar member "h" can obtain the address IPi that will be used by the enrollee device "i" as a member of the instance 20 of the ad hoc network. The address for the requesting device can be obtained by the given network member in several ways, as described below.

In some implementations, at 276, the given network member can assign an address for the requesting device. In the examples illustrated in FIG. 1, the registrar member "h" can assign an address IPi=z for the enrollee device "i" that is different from the other IP addresses known by the registrar member "h", IPf, IPg, IPh, that correspond to the members of the instance 10 of the ad hoc network. In these implementations, at 277, the registrar member "h" can transmit to the requesting device "i" the address IPi assigned by the registrar member "h".

In other implementations, at 278, the given network member can receive a self-assigned address from the requesting device. In the examples illustrated in FIG. 1, the registrar member "h" can receive from the enrollee device "i" an address IPi=z that was self-assigned by the enrollee device "i".

In addition to having obtained by the given network member, at 275, the address for the requesting device, the same also has been acquired by the requesting device, either at 277 or at 278. As the requesting device has acquired an address IPi, and as the address IPi acquired by the requesting device is known by at least another member of the ad hoc network, in this case by the given network member, the requesting device can now be considered a member of the ad hoc network. Moreover, regardless of how the address for the requesting device was obtained by the given network member, the latter can update the locally stored set of addresses by adding the address IPi of the newest network member "i" to the set.

At 280, the given network member notifies devices of the mobile, wireless ad hoc network corresponding to the locally stored set of addresses about the address associated with the newest device of the mobile, wireless ad hoc network. In the examples illustrated in FIG. 1, the network member "h" that acted as a registrar for enrolling the new member "i" can transmit a signal indicative of the address IPi of the newest network member "i". This transmission can be multicast to the mobile devices "f" and "g" that were members of the instance 10 of the ad hoc network, before the mobile device "i" became the newest member of the instance 20 of the hoc network.

Figure 3:
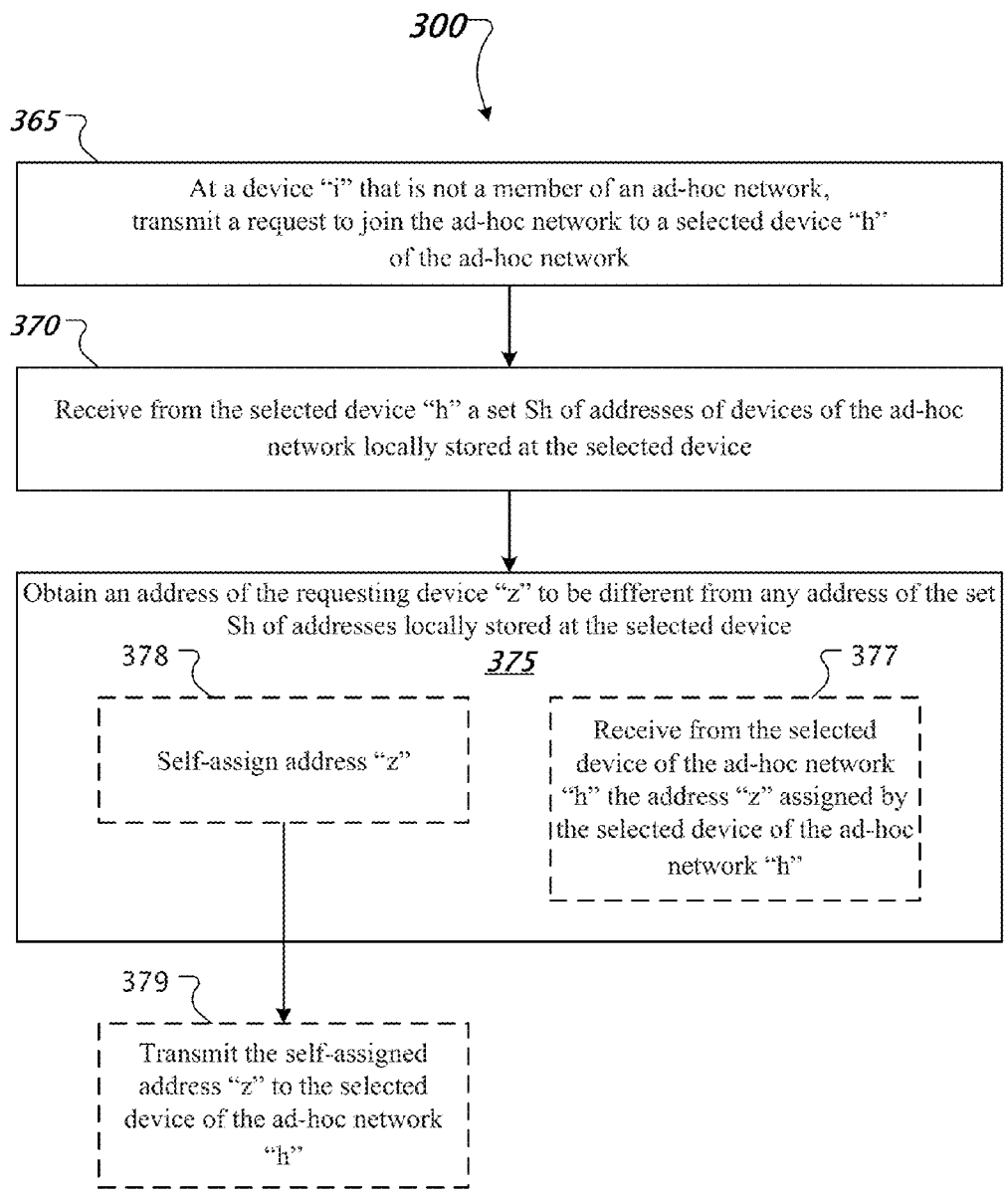
FIG. 3 shows an example of a process used by a device to enroll as a member in an ad hoc network.

FIG. 3 shows an example of a process 300 used by a device to enroll in an ad hoc network. In the examples illustrated in FIG. 1, the process 300 can be performed by an enrollee device "i" in communication with a registrar member "h" of the mobile, wireless ad hoc network.

At 365, a device transmits to a selected device of an ad hoc network a request to join the ad hoc network. In the examples illustrated in FIG. 1, the mobile device "i" can send a signal to indicate a request to enroll in the instance 10 of the ad hoc network to a selected network member of the ad hoc network. In some implementations, a member of the mobile, wireless ad hoc network can be randomly selected by the requesting device. For example, the enrollee device "i" can randomly select a registrar of the ad hoc network from among multiple network members that have emitted signals indicating their ability to act as registrars of the ad hoc network. In other implementations, the member of the mobile, wireless ad hoc network can be selected as a registrar by the requesting device based on predefined criteria. An example of a selection criterion is a discovery order, such that the registrar member is selected by the enrollee device if the former was discovered by the latter within a predetermined quantity of most recently discovered network members. Another example of a selection criterion is signal quality, such that the registrar member is selected by the enrollee device if a signal received from the former meets or exceeds a predetermined quality metric, e.g., signal strength, bit error rate, etc.

At 370, the requesting device receives from the selected network member information including a set of addresses of devices of the ad hoc network known by the selected network member. In the examples illustrated in FIG. 1, the enrollee device "i" can receive from the registrar member "h" membership information for the ad hoc network. The received membership information can include a set of addresses Sh that is locally stored by the registrar member "h", where the IP addresses in the set Sh correspond to the mobile devices that are known by the registrar member "h" to be members of the instance 10 of the ad hoc network. Moreover, each one of the IP addresses in the set Sh corresponds to a MAC address associated with one network member.

The membership information can also include security information corresponding to combinations of MAC and IP addresses of the network members. The security information corresponding to the network members of the instance 10 of the ad hoc network, which is received by the requesting device as part of the discovery and registration process 300, can be used by the requesting device, after it enrolls in the ad hoc network, to reduce or skip additional protocols for setting up secure communications with other network members.

Further, the requesting device can be configured to locally store in persistent storage (e.g., flash memory, solid-state drive, hard drive, and the like) the membership information of the ad hoc network known by and received from the selected network member. Once the requesting device completes the registration process and becomes a member of the ad hoc network, the locally stored membership information can be later updated via communications with other network members.

At 375, the requesting device obtains an address different from any address of the set of addresses received from the selected network member. The obtained address represents an IP address that will be used by the requesting device once it becomes a member of the ad hoc network. In the examples illustrated in FIG. 1, the enrollee device "i" can obtain the address IPi to be used as a member of the instance 20 of the ad hoc network. The address for the requesting device can be obtained by the requesting device in several ways, as described below.

In some implementations, at 378, the requesting device can self-assign an address. In the examples illustrated in FIG. 1, the enrollee device "i" can self-assign an IP address IPi=z that is different from any of addresses IPf, IPg, IPh included in the received set of addresses Sh. In these implementations, at 379, the self-assigned address IPi can be transmitted to the registrar member "h" of the mobile, wireless ad hoc network.

In other implementations, at 377, the requesting device can receive from the selected member of the ad hoc network an address assigned by the selected member of the ad hoc network. In the examples illustrated in FIG. 1, the enrollee device "i" can receive from the registrar member "h" an IP address IPi=z that was assigned by the registrar member "h".

In addition to having obtained, by the requesting device, at 375, an address for the requesting device, the same also has been obtained by the selected network member of the ad hoc network, either at 377 or at 379. As the requesting device has obtained an address IPi, and as the address IPi obtained by the requesting device is known by at least another member of the ad hoc network, in this case by the selected network member, the requesting device can now be considered a new member of the ad hoc network.

Figure 4:
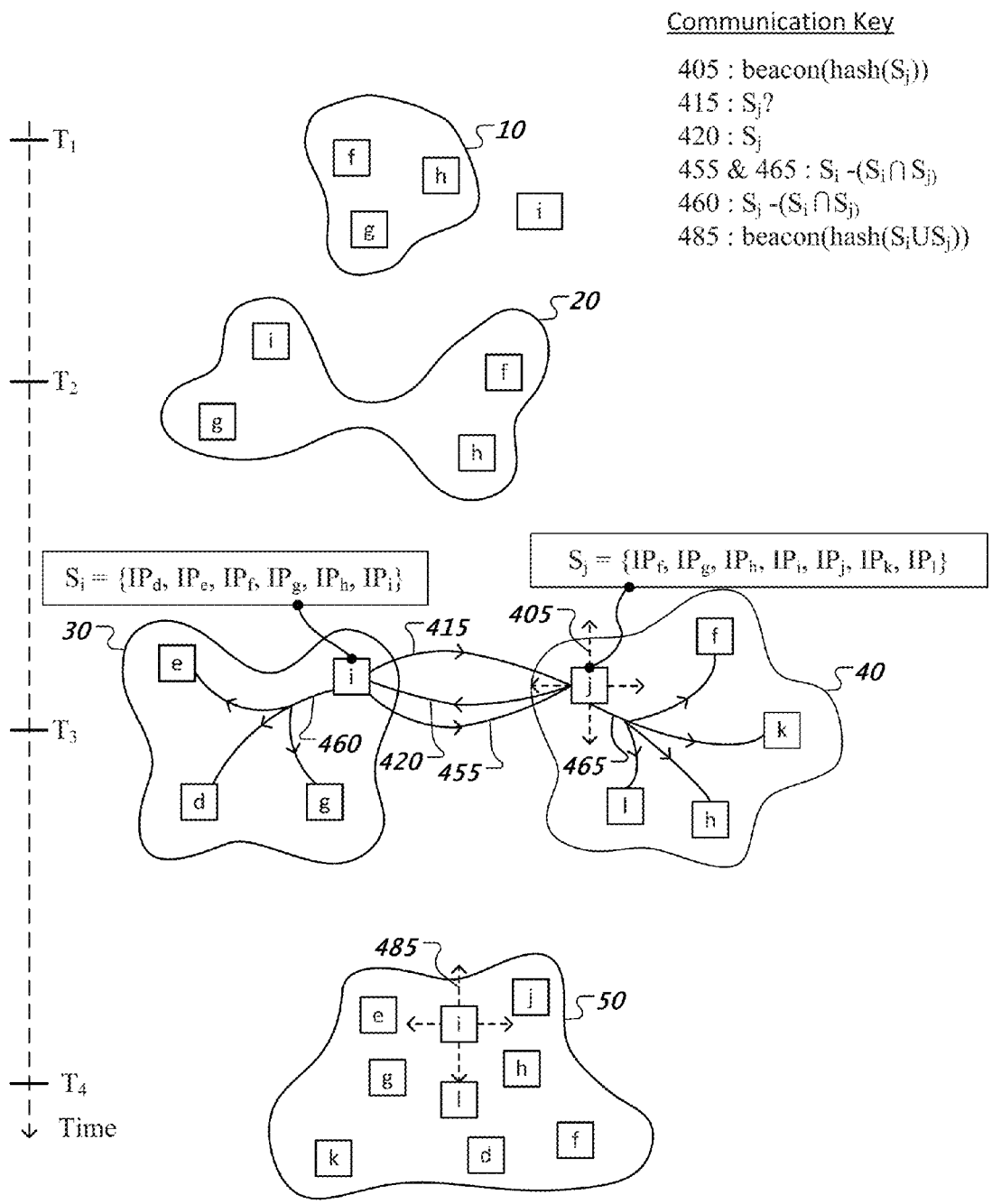
FIG. 4 shows aspects of technology used to coalesce previously disconnected portions of an ad hoc network.

FIG. 4 shows aspects of technology used to coalesce portions of a mobile, wireless ad hoc network that have been disconnected. Two portions of the ad hoc network are considered to be disconnected when network members can exchange membership information within each of the two portions, but not between the two portions. Two portions of the ad hoc network that have been disconnected can coalesce to form a coalesced ad hoc network if respective sets of IP addresses of devices associated with the two formerly disconnected portions are exchanged between the two formerly disconnected portions, as described below in this specification.

Revisiting the example of the group of classmates at the stadium, as the number of classmates in the group increases, the group may split into two subgroups which would be seated in two different sections of the stadium. In this fashion, the ad hoc network associated with the group of classmates may split into two disconnected portions corresponding to the two separated subgroups, and hence, membership knowledge of devices associated with the two portions of the ad hoc network can diverge. Moreover, after the respective portions of the ad hoc network associated with the two subgroups of classmates separate, some of the classmates may turn their mobile devices off, and new classmates may join either one or the other of the two portions of the ad hoc network. When the classmates of the two subgroups reunite during the half time break in a common area, e.g., at the food stands, they would like to share their recently acquired pictures with classmates from the reunited group. The systems and techniques described below in connection with FIGS. 4-6 can be used to coalesce the two portions of the ad hoc network associated with the two subgroups of classmates.

A first instance 10 of the ad hoc network is depicted at a time T1, before a mobile device "i" has requested to join the ad hoc network. A second instance 20 of the ad hoc network is depicted at a time T2, after the mobile device "i" has joined the network, and before portions of the ad hoc network have split into two disconnected portions. At a time T3, a third instance of the ad hoc network is depicted as being split into two disconnected portions 30 and 40 of the ad hoc network. A fourth instance 50 of the ad hoc network is depicted at a time T4, after the two disconnected portions 30 and 40 of the third instance of the ad hoc network have coalesced.

As described above in connection with FIGS. 1-3, the network members are configured to locally store information related to membership of the ad hoc network. For instance, each one of the network members can store a set of IP addresses known by the one network member to be associated with the ad hoc network. In addition, the network members can be configured to share knowledge of membership of the ad hoc network with other network members. For example, each one of the network members can share with the other network members information about the locally stored set of IP addresses known by the one network member to be associated with the ad hoc network. The information about the locally stored set of IP addresses can be shared by the one network member with other members of the same ad hoc network by providing occasional request/response messages or by continuously beaconing messages. The occasionally provided or continuously beaconed messages include information about the locally stored set of IP addresses known by the network member to be associated with the ad hoc network.

Additionally, these messages also can contain a network identifier, such that other network members of the same ad hoc network can consider the information included in these messages (as described below in this specification), while devices that are not part of an ad hoc network or are members of another, different ad hoc network can ignore the information included in these messages. A network identifier can be a subnet mask or a suggestive (user friendly) network name associated with the ad hoc network. As an example of the latter, the identifier of the ad hoc network can be "Ms. Jones' class at the Giants game". The network identifier can be provided by a registrar member to each of the enrollees as part of the enrollment process described above in connection with FIG. 1. Subsequently, the provided network identifier can be locally stored by each of the network members, and can be transmitted along with communications between the members of the ad hoc network.

In some implementations, the messages can include the entire locally stored set of IP addresses. By transmitting the entire locally stored set of IP addresses, a network member may enable other members to update their respective locally stored sets of IP addresses. However, if the quantity of network members N is large, sharing the entire set of IP addresses can be lengthy, expensive or both.

In other implementations, the messages can include one or more portions of the locally stored set of IP addresses, for instance corresponding to the first (or last) k mobile devices enrolled in the ad hoc network (where k<<N). For example, only the IP address of the newest member (and/or time when the newest member has enrolled) can be included in a message. By transmitting a small subset of the locally stored set of IP addresses, a given network member may enable other network members to infer whether their respective locally stored sets of IP addresses are different from the set of IP addresses stored by the given network member. Although such messages may be concise, the fact that only a small subset of IP addresses of the locally stored set of IP addresses is provided to other network members may not fully prevent membership conflicts. In this context, a membership conflict can occur when at least two network members have the same IP address.

In some other implementations, the messages can include a hash of the locally stored set of IP addresses known by the network member to be associated with the ad hoc network. Such a hash of a set of IP addresses stored locally at a network member represents a fingerprint of the current membership of the ad hoc network as known by the network member. Based on the properties of the hash function, if two sets of IP addresses are different, the respective hashes of the two different sets are necessarily different. Thus, if two hashes of respective sets of IP addresses are different, the respective sets of IP addresses are necessarily different.

For example, a given network member can transmit messages including a hash of the locally stored set of IP addresses known by the given network member to be associated with the ad hoc network. When the given network member determines a change in the membership of the ad hoc network, e.g., obtains an IP address of a new network member, the given network member can update the locally stored set of IP addresses accordingly. Then, the given network member can transmit messages including a hash of the updated set of IP addresses, which is different from the hash of the previously known set of IP addresses. By receiving the latter messages, other network members become aware that the given network member's knowledge of network membership has changed.

As another example, first and second network members can exchange messages including respective hashes of first and second sets of IP addresses stored locally at the first and second network members, respectively. If the hashes included in the exchanged messages are equal, then the first and second network members can infer that their information of network membership is the same. However, if the hashes included in the exchanged messages are not equal, then the first and second network members can infer that their information of network membership is different.

For instance, prior to the time T3, the network member "i" locally stores the set of IP addresses Si={IPd, IPe, IPf, IPg, IPh, IPi}, corresponding to the mobile devices "d", "e", "f", "g", "h", "i" which represent the membership of the ad hoc network as known by the member "i". The member "i" knows that the mobile devices "f", "g", "h" have been part of the ad hoc network since the member "i" joined the ad hoc network at the time T2. The network member "i" also knows that the mobile devices "d" and "e" have joined the ad hoc network between the time T2 and the time T3.

As described above, the network member "i" can provide succinct but comprehensive messages to inform other network members of the network membership of the ad hoc network as known by the network member "i". For example, such messages include a hash H(Si) of the locally stored set of IP addresses Si={IPd, IPe, IPf, IPg, IPh, IPi} known by the network member "i" to be associated with the ad hoc network. The network members "d", "e", "g" that can receive messages from the network member "i" are included in the portion 30 of the ad hoc network. Accordingly, the members of the portion 30 of the ad hoc network can share membership knowledge with each other, and thus can locally store sets of IP addresses identical with the set Si locally stored by the network member "i". However, as the portions 30 and 40 of the ad hoc network are disconnected prior to the time T3, the network member "i" that is part of the portion 30 cannot share membership information with the network members "f", "h", "j", "k", "l" from the portion 40. Therefore, prior to the time T3, the network member "i" is unaware that the mobile devices "j", "k", "l" have joined the ad hoc network.

Similarly, prior to the time T3, the network member "j" locally stores the set of IP addresses Sj={IPf, IPg, IPh, IPi, IPj, IPk, IPl}, corresponding to the mobile devices "f", "g", "h", "i", "j", "k", "l" which represent the membership of the ad hoc network as known by the network member "j". The network member "j" is in direct communication with the mobile devices "f", "h", "k", "l" as members of the portion 40 of the ad hoc network. In addition, the member "j" knows that devices "i" and "g" are part of the ad hoc network from information shared by the network member "j" with the network members "f" and "h", which were part of the instance 20 of the ad hoc network at the time T2.

The network member "j" can transmit a message 405 that includes information about membership of the ad hoc network, as known by the network member "j". The transmission can be in the form of a beacon, and the information can be a hash H(Sj) of the locally stored set of IP addresses Sj. Starting at the time T3, the communication channel between the member "j" of the network portion 40 and the member "i" of the network portion 30 is such that the beaconed message 405 can be intercepted by the network member "i". The communication channel between two mobile devices can be affected at least by a distance between the mobile devices, obstructions along the line of sight between the mobile devices, emission power at the emitting mobile device, and reception resources at the receiving mobile device, etc. Upon receipt of the message beaconed by the network member "j", the network member "i" can compare the hash H(Sj) of the set Sj of IP addresses known by the network member "j" with the hash H(Si) of the set of addresses known by the network member "i". In this case, the network member "i" finds that the hashes of the two sets are different H(Sj)≠H(Si).

The determination of different membership knowledge across the portions 30 and 40 of the ad hoc network can prompt the network member "i" to initiate a process of coalescing these two portions. As part of initiating the coalescence process, the network member "i" transmits, to the network member "j", a request 415 for the locally stored set of addresses Sj. In turn, the network member "j" can transmit, to the network member "i", a response 420 that includes the locally stored set of IP addresses Sj. Upon receipt of the response 420 from the network member "j", the network member "i" can determine a subset of IP addresses locally stored at both of the network members "i" and "j". The determined subset contains addresses from the set of addresses Si locally stored at the network member "i" that also are from the set of addresses Sj locally stored at the network member "j". Hence, the subset of IP addresses locally stored at both of the network members "i" and "j" can be determined as the intersection Si∩Sj of the sets Si and Sj. In the examples illustrated in FIG. 4, the subset of IP addresses locally stored at both of the network members "i" and "j" is Si∩Sj={IPf, IPg, IPh, IPi}, and corresponds to the mobile devices "f", "g", "h", "i".

Note that in the case illustrated in FIG. 4, no membership conflict has been detected as part of determining the subset Si∩Sj of IP addresses locally stored at both of the network members "i" and "j", because the four addresses IPf, IPg, IPh, IPi in Si∩Sj belong to four distinct network members "f", "g", "h", "i". However, if the network member "i" detects a membership conflict by determining that one of the IP addresses locally stored at both of the network members "i" and "j" belongs to two network members, then the network member "i" would initiate a conflict resolution process as described below in connection with FIGS. 7 and 8.

Returning to the conflict-free case illustrated in FIG. 4, the network member "i" can determine a subset of addresses from the set of addresses Si locally stored at the network member "i" that are not in the set of addresses Sj locally stored at the network member "j". This subset contains the IP addresses locally stored at the network member "i" (and at the other members of the portion 30 of the ad hoc network), but are not stored at the network member "j" (nor at the other members of the portion 40 of the ad hoc network). Hence, the subset of IP addresses locally stored at the network member "i" but not stored at the network member "j" can be determined as the difference Si−(Si∩Sj) between the set of addresses Si locally stored at the network member "i" and the subset of IP addresses Si∩Sj stored at both of the network members "i" and "j". In the examples illustrated in FIG. 4, the subset of IP addresses locally stored at the network member "i" but not stored at the network member "j" is Si−(Si∩Sj)={IPd, IPe}, and corresponds to the mobile devices "d", "e". The process of coalescing the portions 30 and 40 of the ad hoc network can continue as the network member "i" transmits, to the network member "j", a message 455 including the determined subset of IP addresses (Si−(Si∩Sj)) locally stored at the network member "i" but not stored at the network member "j".

Furthermore, the network member "i" can determine a subset of addresses from the set of addresses Sj locally stored at the network member "j" that are not in the set of addresses Si locally stored at the network member "i". This subset contains the IP addresses locally stored at the network member "j" (and at the other members of the portion 40 of the ad hoc network), but are not locally stored at the network member "i" (nor at the other members of the portion 30 of the ad hoc network). Hence, the subset of IP addresses locally stored by the network member "j" but not locally stored at the network member "i" can be determined as the difference $Sj-(Si \cap Sj)$ between the set of addresses Sj locally stored at the network member "j" and the subset of IP addresses $Si \cap Sj$ stored at both of the network members "i" and "j". In the examples illustrated in FIG. 4, the subset of IP addresses locally stored by the network member "j" but not locally stored at the network member "i" is $Sj-(Si \cap Sj)=\{IPj, IPk, IPl\}$, and corresponds to the mobile devices "j", "k", "l". The process of coalescing the portions 30 and 40 of the ad hoc network can continue as the network member "i" transmits, to the other network members of the portion 30 of the ad hoc network, a multicast notification 460 including the determined subset of IP addresses $(Sj-(Si \cap Sj))$ locally stored at the network member "j" but not stored at the network member "i".

Also as part of coalescing the portions 30 and 40 of the ad hoc network, the network member "j" can relay, to the other network members of the portion 40 of the ad hoc network, a multicast notification 465 including the subset of IP addresses $(Si-(Si \cap Sj))$ locally stored at the network member "i" but not stored at the network member "j".

In this manner, at the time T4, the two disconnected portions 30 and 40 of the ad hoc network can coalesce to form a coalesced instance 50 of the ad hoc network, because the respective sets of IP addresses Si and Sj of devices associated with the two previously disconnected portions 30 and 40 of the ad hoc network have been exchanged between the two previously disconnected portions 30 and 40. As such, at the time T4, each of the members of the coalesced instance 50 of the ad hoc network has updated its locally stored set of IP addresses associated with the coalesced instance 50 of the ad hoc network. The updated set of IP addresses represents the reunion $Si \cup Sj$ of the sets Si and Sj. In the examples illustrated in FIG. 4, the updated set of IP addresses locally saved at each of the mobile devices "d", "e", "f", "g", "h", "i", "j", "k", "l" of the coalesced instance 50 of the ad hoc network is $Si \cup Sj=\{IPd, IPe, IPf, IPg, IPh, IPi, IPj, IPk, IPl\}$.

Moreover, each one of the members of the coalesced instance 50 of the ad hoc network, e.g., network member "i", can transmit a message 485 that includes information about membership of the coalesced instance 50 of the ad hoc network, as known by the one network member. The transmission can be in the form of a beacon, and the information can be a hash $H(Si \cup Sj)$ of the locally stored set of IP addresses $Si \cup Sj$.

Figure 5:
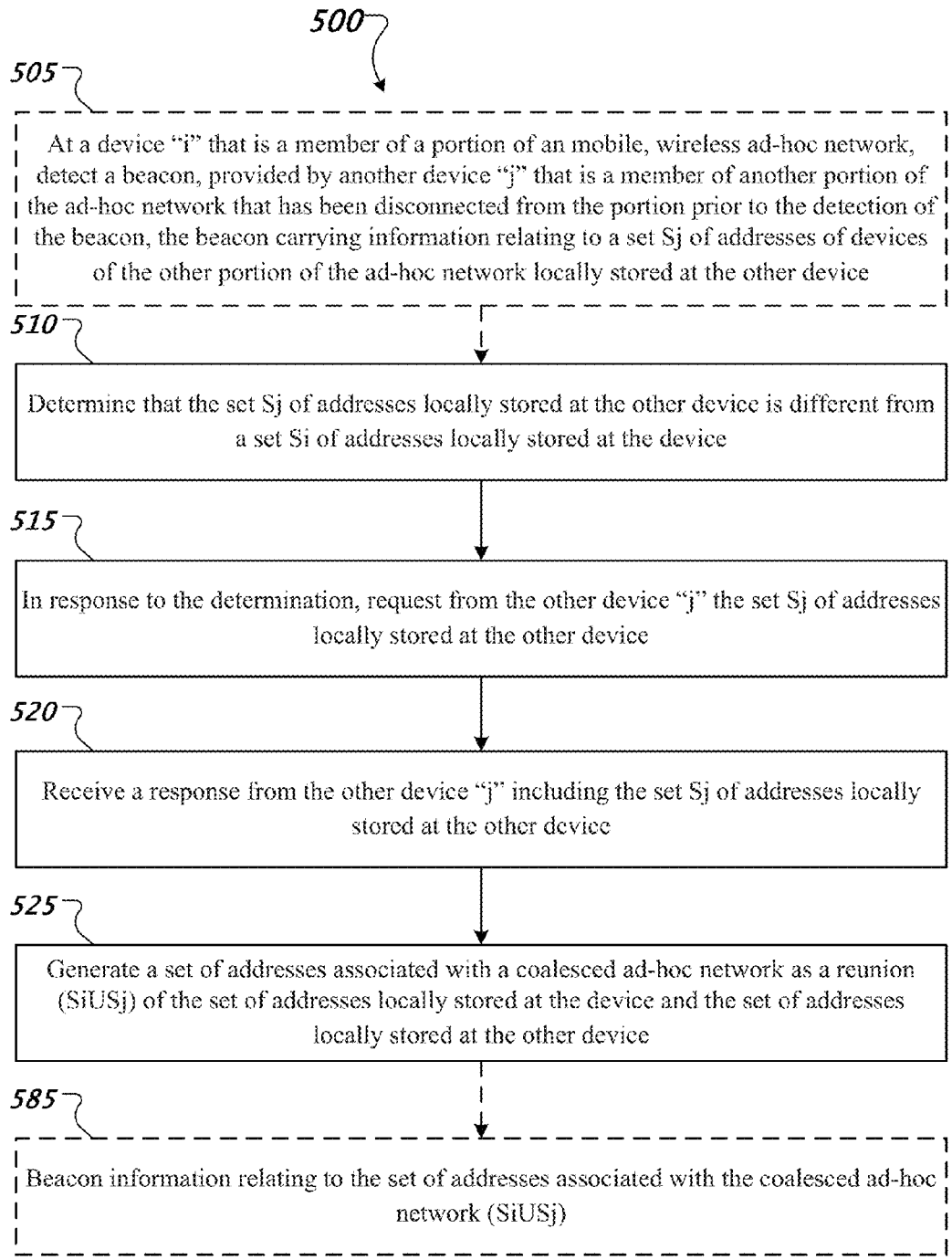
FIG. 5 shows an example of a process used by a member of an ad hoc network to update its own information about current membership of the ad hoc network.

FIG. 5 shows an example of a process 500 used by a member of an ad hoc network to update its own information about current membership of the ad hoc network. The process 500 can be executed by a first device that is part of a first portion of a mobile, wireless ad hoc network.

At 505, a first device that is a member of a first portion of an ad hoc network receives information from a second device that is part of a second portion of the ad hoc network. Until a time corresponding to the reception performed at 505, the first and second portions of the ad hoc were disconnected. Portions of the ad hoc network can be considered disconnected when membership information can be exchanged on an intra-portion basis, but cannot be exchanged on an inter-portion basis. The received information relates to a second set of addresses that is locally stored at the second device. In some implementations, the information relating to the second set of addresses can be received by the first device via an information carrying beacon emitted by the second device. In other implementations, the information relating to the second set of addresses can be received by the first device via short request/response messages exchanged between the first and second devices. Furthermore, the information relating to the second set of addresses can be in the form of a hash of the second set of addresses of the devices associated with the second portion of the ad hoc network.

At 510, the first device determines that the second set of addresses is different from a first set of addresses that is locally stored at the first device. The determination can be performed by the first device by comparing the received hash of the second set of addresses locally stored at the second device with a hash of the first set of addresses locally stored at the first device. In this case, the first device detects that the respective hashes of the first and second set of addresses are unequal, and hence, determines that the locally stored set of addresses is different from the set of addresses locally stored at the second device.

At 515, in response to determining that the network membership known by the first device is different from the network membership known by the second device, the first device requests from the second device the second set of addresses locally stored at the second device. The request transmitted by the first device at 515 can initiate the coalescing the first and second previously disconnected portions of the ad hoc network.

At 520, the first device receives a response from the second device including the second set of addresses locally stored at the second device. The first device can compare the locally stored first set of addresses with the received second set of addresses to identify common addresses and different addresses between the two sets of addresses. Based on results of this comparison, the first device can notify devices associated with the first portion of the ad hoc network about the identified different addresses. Also based on the results of this comparison, the first device can notify the second device of the identified different addresses. The comparison and the notifications can be performed in accordance with method 600 described below in connection with FIG. 6.

At 525, the first device generates a set of addresses associated with a coalesced ad hoc network as a reunion of the first set and the second set of addresses. The generated set of addresses represents an update of the first set of addresses locally stored at the first device and includes IP addresses of the previously disconnected first and second portions of the ad hoc network. As differences in membership knowledge have been propagated from the first device to the other devices of (first and second portions of) the ad hoc network, the latter have updated their own locally stored set of addresses, completing the coalescing of the previously disconnected first and second portions of the ad hoc network.

At 585, the first device can share its knowledge of membership associated with the coalesced ad hoc network. For example, the first device can beacon a hash of the set of addresses associated with the coalesced ad hoc network.

Figure 6:
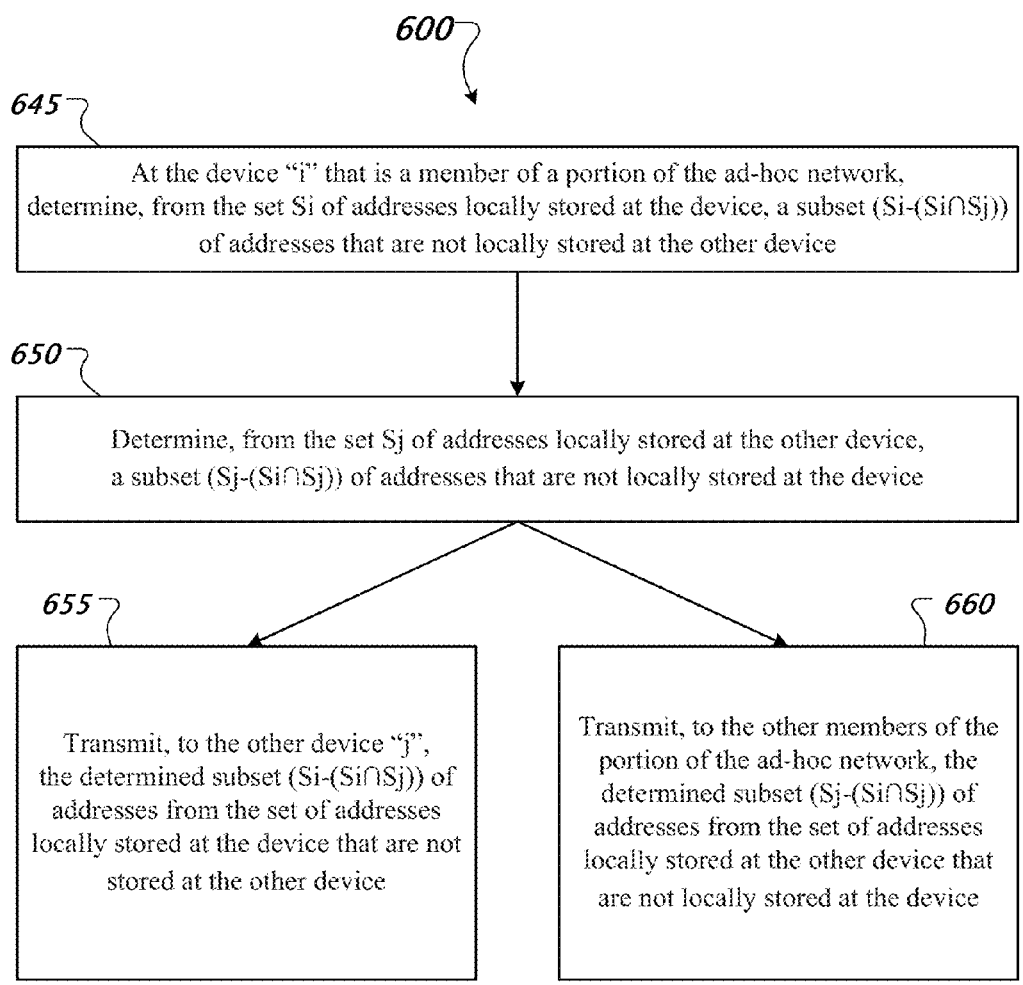
FIG. 6 shows an example of a process used by a member of an ad hoc network to provide other members of the ad hoc network information about current membership of the ad hoc network.

FIG. 6 shows an example of a process 600 used by a member of an ad hoc network to provide other members of the ad hoc network information about current membership of the ad hoc network. The process 600 can be executed in conjuncture with the process 500, for example, upon receiving, at 520, from another member of the ad hoc network of a set of addresses locally stored at the other network member that is different from a set of addresses locally stored at the network member. Knowledge of ad hoc network membership can diverge between network members when a portion of the ad hoc network that includes the network member becomes disconnected from another portion of the ad hoc network that includes the other network member.

At 645, a first device that is a member of an ad hoc network determines, from a locally stored first set of addresses, a subset of addresses associated with the ad hoc network that are not locally stored at a second device that is a member of the ad hoc network. The first set of addresses is associated with devices known by the first device to be members of the ad hoc network. The determination, at 645, can be performed by the first device by comparing the locally stored first set of addresses with a second set of addresses received by the first device from the second device. The second set of addresses is locally stored at the second device and is associated with devices known by the second device to be members of the ad hoc network. Moreover, the fact that the first and second sets of addresses are different means that the first device is included in a first portion of the ad hoc network that has been disconnected from a second portion of the ad hoc network that includes the second device. The subset of addresses associated with the ad hoc network determined at 645 contains addresses that are locally stored at the first device but not at the second device. As such, the determined subset represents network membership that is known by the first device (and by other devices of the first portion of the ad hoc network,) but is not known by the second device (and by other devices of the second portion of the ad hoc network.)

At 650, the first device determines, from the second set of network addresses, a subset of addresses that are not locally stored by the first device. The determination, at 650, can be performed by the first device through the above comparing the locally stored first set of addresses with the second set of addresses received by the first device from the second device. Hence, the subset of addresses associated with the ad hoc network determined at 650 contains addresses that are locally stored at the second device but not at the first device. As such, the determined subset of addresses represents network membership that, prior to receiving the second set of addresses from the second device by the first device, was known by the second device (and by other devices of the second portion of the ad hoc network,) but was not known by the first device (and by other devices of the first portion of the ad hoc network.)

At 655, the first device transmits, to the second device, the determined subset of addresses from the locally stored first set of addresses that are not locally stored at the second device. In this fashion, the second device can update a locally known state of network membership with the network membership that was known by the first device but was not known by the second device. In addition, the second device can propagate the updated membership knowledge to the other devices of the second portion of the ad hoc network.

At 660, the first device transmits, to other devices of the first portion of the ad hoc network, the determined subset of addresses from the second set of addresses received from the second device that are not locally stored at the first device. In this fashion, the first device can propagate the updated state of ad hoc network membership to the other devices of the first portion of the ad hoc network. Propagating the updated membership knowledge, performed at 655 and 660, completes the coalescing of the first and second portions of the ad hoc network.

Figure 7:
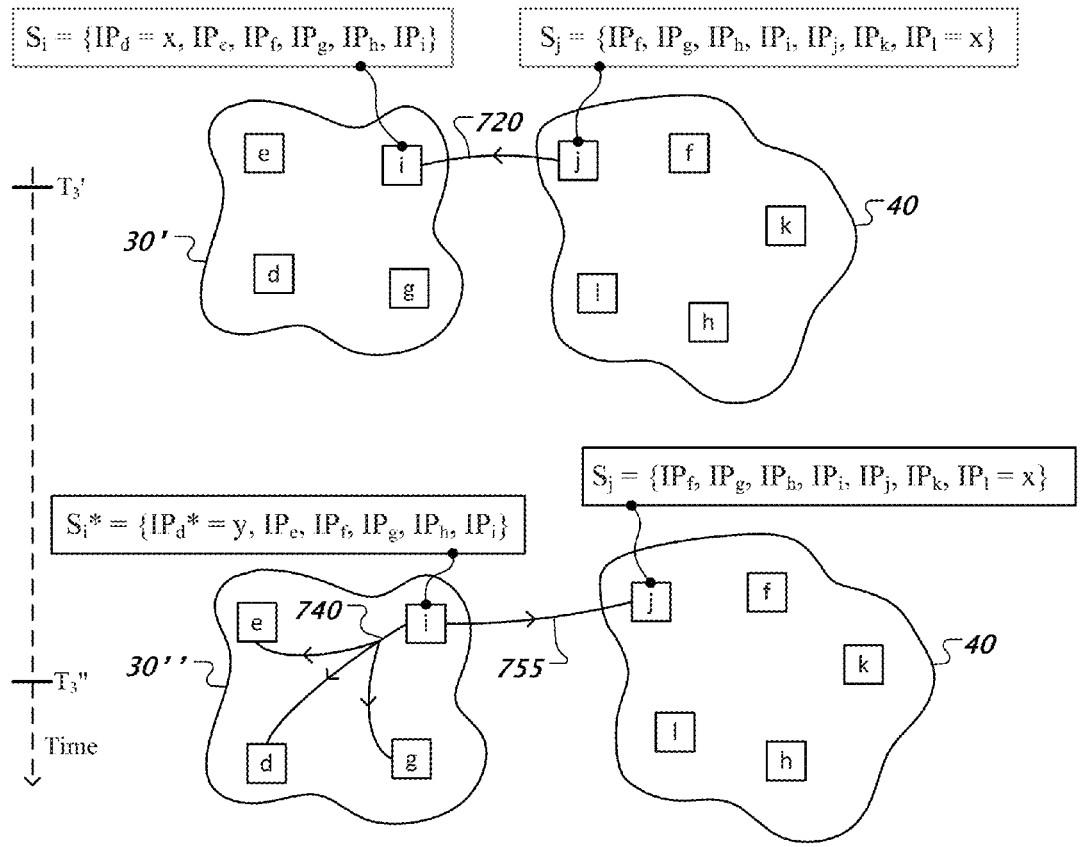
FIG. 7 shows aspects of technology used to address membership conflicts between two previously disconnected portions of an ad hoc network.

FIG. 7 shows aspects of technology used to address membership conflicts between two previously disconnected portions of an ad hoc network. This technology can be used in conjunction with the technology used to coalesce the two previously disconnected portions of the ad hoc network, as described above in connection with FIG. 4, for example, after a network member "i" has determined that locally known network membership is different from the knowledge of network membership at another network member "j".

Revisiting the example of the group of classmates at the stadium, as the two subgroups have split and separately drifted to two different sections of the stadium, new classmates may have joined the two separated groups. Assume that a mobile device that joined the first portion of the ad hoc network has been assigned the same address as another mobile device that joined the second portion of the ad hoc network. When the classmates of the two subgroups reunite, in order for the two previously disconnected portions of the ad hoc network to coalesce, in accordance with the technology described above in connection with the FIGS. 4-6, any membership conflicts should be resolved prior to completing the coalescing process. The systems and techniques described below in connection with the FIGS. 7 and 8 can be used to address conflicts between the two portions of the ad hoc network associated with the two subgroups of classmates.

At a time T3', an instance of the ad hoc network is depicted as being split into two disconnected portions 30' and 40 of the ad hoc network. The time T3' corresponds to receiving, by the network member "i" from the network member "j", a response 720 that includes the set of addresses Sj locally stored at the network member "j". Upon receipt of the response 720 from the network member "j", the network member "i" can determine conflicting addresses within the locally stored set of addresses Si and the other set Sj of addresses that is locally stored at the network member "j". In the examples illustrated in FIG. 7, the device "d" that is part of the portion 30' of the ad hoc network has an IP address value IPd=x, and the device "l" that is part of the portion 40 of the ad hoc network has the same IP address value IPl=x.

In some implementations, in response to detecting the conflicting addresses IPd and IPl, the network member "i" can assign to the device "d" that is part of the same portion 30' of the ad hoc network as the network member "i", another IP address value IPd*=y, different from the IP address value IPl=x associated with the device "l" that is part of the other portion 40 of the ad hoc network. In this fashion, at a time T3", the network member "i" can update the locally stored set of IP addresses Si*={IPd*=y, IPe, IPf, IPg, IPh, IPi}. Moreover, the network member "i" can transmit, to the other network members of the portion 30" of the ad hoc network, a multicast notification 740 including the newly assigned IP address value IPd*=y. The device "d" can receive the notification 740 and adopts the newly assigned address IPd*. In addition, the other devices that are network members of the portion 30" of the ad hoc network can receive the notification 740 and update their respective locally stored sets of IP addresses.

As the addressing conflict has been resolved within the portion 30" of the ad hoc network, the network member "i" can determine the subset of addresses from the set of addresses Si* locally stored at the network member "i" that are not in the set of addresses Sj locally stored at the network member "j", in accordance with the technologies described above in connection with FIGS. 4 and 6. Finally, the coalescing of the portions 30" and 40 of the ad hoc network can continue as the network member "i" transmits, to the network member "j", a message 755 including the determined subset of IP addresses (Si*−(Si*∩Sj)) locally stored at the network member "i" but not stored at the network member "j", also in accordance with the technologies described above in connection with FIGS. 4 and 6.

In some implementations, in response to detecting the conflicting addresses IPd and IPl, the network member "i" can notify the network member "j" of the detected conflict and can request that the network member "j" resolves the conflicting addresses within the portion 40 of the ad hoc network. In such case, the network member "j" can assign a new address to network member "l", then can notify the devices that are part of the portion 40 of the ad hoc network about the new address assigned to the network member "l". Further, the network member "j" also can send the updated address of the network member "l" to the network member "i". In this fashion, the latter can perform the process of coalescing the two previously disconnected portions 30' and 40 in a conflict-free manner, in accordance with the technologies described above in connection with FIGS. 4-6.

Figure 8:
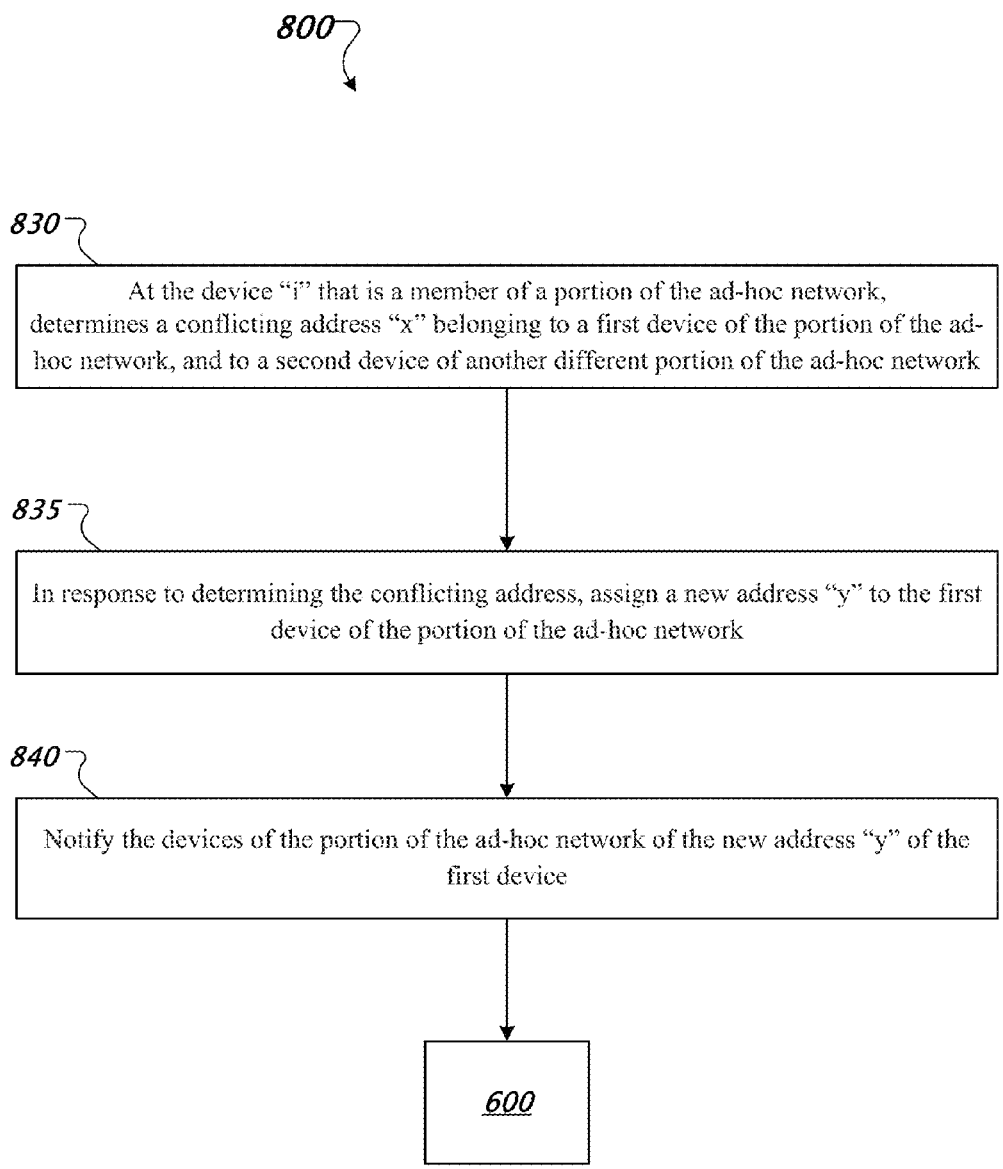
FIG. 8 shows an example of a process used by a member of an ad hoc network to address current membership conflicts between two previously disconnected portions of an ad hoc network.

FIG. 8 shows an example of a process 800 used by a member of an ad hoc network to address current membership conflicts between two disconnected portions of an ad hoc network. The process 800 can be executed in conjuncture with the process 600.

At 830, a device that is a member of a first portion of an ad hoc network, detects conflicting addresses within a locally stored set of addresses and another set of addresses that is locally stored at another device. The other device is a member of a second portion of the ad hoc network, where the first and second portions of the ad hoc network have been disconnected prior to receiving, by the device from the other device, the other set of addresses stored at the other device. The conflicting addresses can belong to a first device that is a member of the first portion of the ad hoc network, and to a second device that is a member of the second portion of ad hoc network.

At 835, in response to the detection of the conflicting addresses, the device assigns a new address to the first device that is different from the conflicting address of the second device. At 840, the device notifies the other devices of the first portion of the ad hoc network about the newly assigned address value for the first device. Based on the actions at 835 and 840, the membership conflict can be resolved by only updating addresses in the first portion of the ad hoc network, in a manner that is transparent to the devices of the second portion of the ad hoc network. Moreover, the coalescing of the first and second conflict-free portions of the ad hoc network can continue in accordance with the process 600 described above in connection with FIG. 6.

The disclosed systems and techniques used to assign addresses and manage the assigned addresses in ad hoc networks are described above in this specification in the context of wireless, mobile ad hoc networks. Moreover, the described technologies can be applied to network environments that include wireless and wired connections. In addition, the systems and techniques described in this specification can be applied to fully wired network environments. An example of the latter network environment in which the disclosed technologies can be advantageously applied is a peer-to-peer (P2P) network running over tunnels. In such network environment, the peers can connect to the P2P network using virtual private network (VPN) tunneling. While the peers of the P2P network running over tunnels may have IP addresses that have been pre-assigned externally to the P2P network, local addresses used by the peers within the P2P network can be assigned and managed using the systems and techniques described in this specification.

In general, the technologies described in this specification can be used in an ad hoc network environment that (i) lacks complete connectivity at all times between network members, and (ii) uses a locally constrained address space from which peer addresses can be assigned. In such an ad hoc network, peer devices can be turned on and off (in a wired or wireless network) or can travel in and out of range of a portion of the ad hoc network (in a wireless network.)

Figure 9:
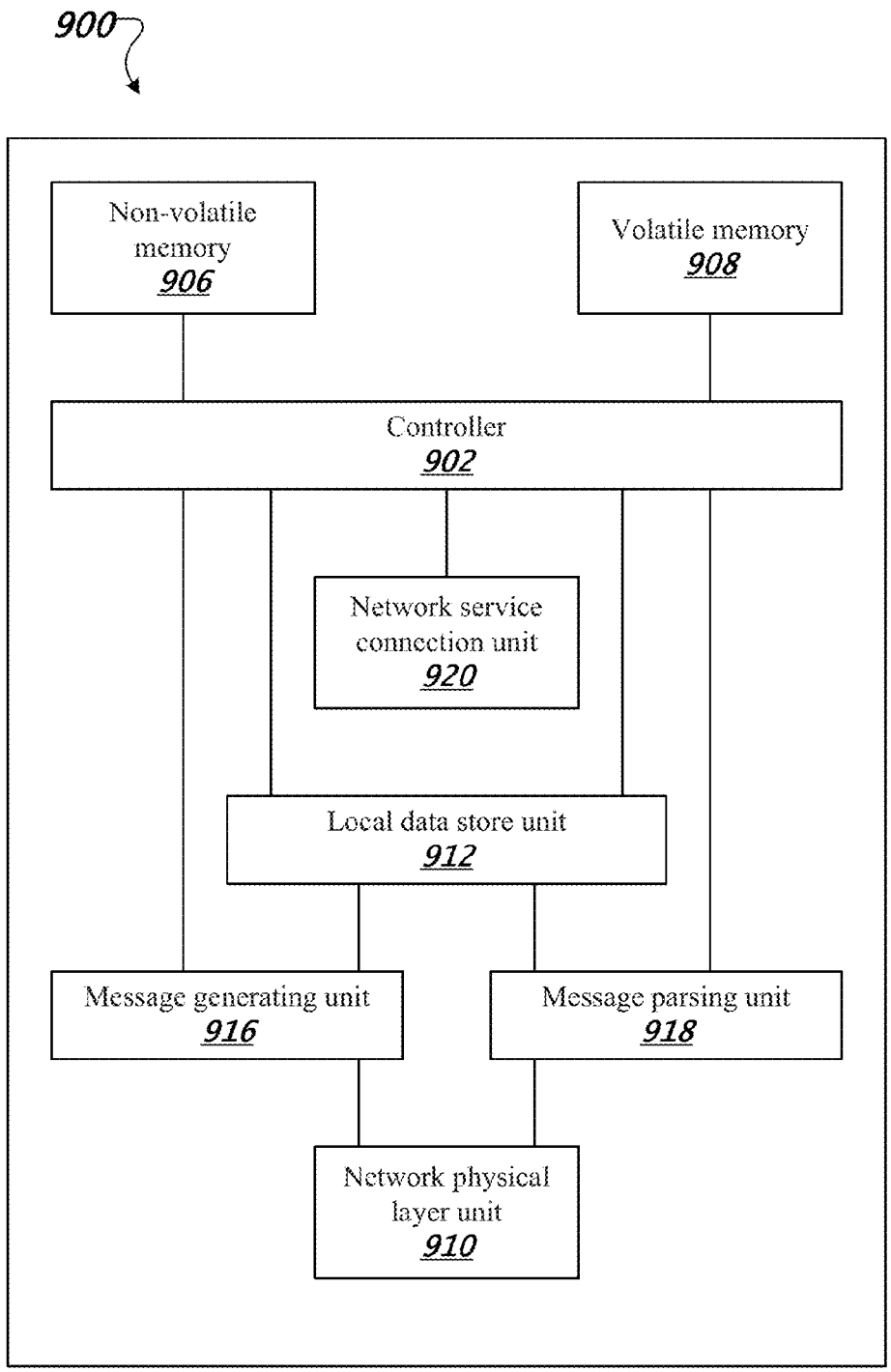
FIG. 9 shows an example of a device that supports management of network membership, and more specifically management of membership in mobile, wireless ad hoc networks.

FIG. 9 is a block level diagram of an example device that supports technologies relating generally to management of network membership, and more specifically to management of membership in ad hoc networks. As shown in FIG. 9, a device 900 can include at least a controller 902 in communication with non-volatile memory 906, volatile memory 908 and a network physical layer unit 910. In addition, controller 902 can communicate with a local data store unit 912, a message generating unit 916, a message parsing unit 918, and a network service connection unit 920.

The features included within the device 900 can be integrated, e.g., within one or more mobile electronic devices such as a laptop computer, cell phone, digital camera, media player, and the like. A mobile electronic device incorporating the device 900 can connect to an ad-hoc wireless network, as illustrated in FIGS. 1, 4 and 7. In this manner, the device 900 can provide connectivity between the mobile device in which the device 900 is incorporated and services provided via an available ad-hoc mode wireless network.

In some implementation, functions performed by network physical layer unit 910, e.g., layer 1, or physical layer, of the Open System Interconnection (OSI) model, can be performed, by a network interface card (NIC) added to an electronic device, or by a physical layer unit embedded with an electronic device's circuitry. Functions performed by controller 902, and subsequent layers of the OSI model, or other network communication model, can be performed by software executed, for example, by a general microprocessor in electronic devices such as a laptop computer, or can be executed, for example, by a separate processor in electronic devices such as smartphones, digital cameras, and media players.

Controller 902 can control processing related to the receipt and transmission of messages across network physical layer unit 910 in accordance with existing ad-hoc network standards, such as the ad-hoc network standard described in IEEE 802.11, but modified as described in detail in this specification, to support management of network membership, and more specifically management of membership in mobile, wireless ad hoc networks. Volatile memory 908 can allow the controller 902 to store program instructions in local memory for execution and to store and maintain temporary variables necessary for execution of the stored program instructions. Non-volatile memory 906 can allow the controller 902 to access and retrieve larger bodies of data and program instructions for later execution by the controller 902. Example processes executed as a result of the execution of such instructions are described in this specification with respect to FIGS. 2, 3, 5, 6 and 8. Examples of larger bodies of data include information stored by the local data store unit 912.

Local data store unit 912 may build and maintain a local data store with information about detected peer devices from which messages, e.g., beacons, probe-requests, public action frames, and/or probe-responses, have been received by the device 900, as a result of the device 900 being a member of a common ad-hoc network, or as a result of the device 900 passively scanning and monitoring local message activities. The peer devices may be stand-alone devices or members of the same ad-hoc network to which the device 900 is connected.

For example, information maintained in the local data store unit 912 can include for each peer device within transmission range of the 900, a network address, a user-friendly name, and QUID for each service offered by the peer device. Data store entries can use a peer device's MAC address as a primary key in the local data store. The local data store can also be configured to include information about the peer device, e.g., the peer device's selected network address, user-friendly name, and universally unique identifier (UUID) for each service offered by the peer device. Information stored in the local data store by the local data store unit 912 can be received from the controller 902, and/or directly from the network service connection unit 920 or the message generating unit 916.

Message parsing unit 918 can receive a message from the network physical layer unit 910 and can parse the received message content to retrieve data that can be passed to the controller 902 and/or the local data store unit 912. For example, the message parsing unit 918 can parse a received message to obtain the MAC address and other information from the message header, and can parse and retrieve information contained within the message such as the information that supports management of network membership, and more specifically management of membership in mobile, wireless ad hoc networks, as addressed in greater detail below. Information retrieved from a received message can be passed to the controller 902 for further processing and decision making and/or portions of the retrieved information can be passed directly to the local data store unit 912 for generating updates to the local data store. Further, the controller 902 can instruct the local data store unit 912 to update information stored in the local data store based on peer device information received from the message parsing unit 918. An entry for a peer device within a device's local data store can expire and can be deleted from the device's local data store if a message, e.g., a beacon, probe-request, public action frame, and/or probe-response is not received from the corresponding peer device within a configurable time duration, e.g. 9 minutes.

Message generating unit 916 can, at the instruction of the controller 902, generate an ad-hoc message for transmission to devices within radio broadcast range. The generated message can be one of a beacon message, probe-request, public action frame, probe-response, or other message, as described in this specification. For example, upon being instructed by the controller 902 of the type of message to be generated, the message generating unit 916 can retrieve current device information and generate information containing, but not limited to, an ad hoc network identifier and a fingerprint of the network membership as locally stored at local data store unit 912 of the device. Further, based on the type of message to be generated, e.g., beacon message, probe-request, public action frame, probe-response, etc., the message generating unit 916 can receive additional information from the controller 902 and/or can request additional information from the local data store unit 912 as described in this specification. Once the message is generated, the message generating unit 916 can send the message to the network physical layer unit 910 for transmission.

Network service connection unit 920 can assist the controller 902 with locating a peer device that can be accessed by the device 900 via an ad-hoc network to obtain a desired service. For example, as described in this specification with respect to FIGS. 1, 4 and 7, the network service connection unit 920 can search local data store unit 912 for a desired service listed in association with a peer device. Upon locating a desired service, the network service connection unit 920 can provide the controller 902 with the network information required, e.g., MAC Address, basic service set identifier (BSSID), etc., for the controller 902 to establish an ad-hoc mode connection to the located peer device, thereby allowing the device 900 to access services available via a peer device connected to an ad-hoc network.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a standalone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:
1. A method comprising:
   at a first device that is part of a first portion of an ad hoc network, receiving, from a second device that is part of a second portion of the ad hoc network, information relating to a second set of addresses associated with the ad hoc network, the second set of addresses being locally stored at the second device, and the first and second portions of the ad hoc network having been disconnected prior to said receiving the information relating to the second set of addresses;

determining that the second set of addresses is different from a first set of addresses associated with the ad hoc network, the first set of addresses being locally stored at the first device;

in response to the determination, requesting from the second device the second set of addresses;

receiving a response from the second device including the second set of addresses; and generating a set of addresses associated with the coalesced first and second portions of the ad hoc network as a reunion of the first and second sets of addresses.

2. The method of claim 1, wherein
the ad hoc network is a wireless ad hoc network, and
the method further comprises beaconing information relating to the set of addresses associated with the coalesced first and second portions of the ad hoc network.

3. The method of claim 1, wherein
the ad hoc network is a wireless ad hoc network, and
the information relating to the second set of addresses is received by the first device via a beacon carrying the information that was emitted by the second device.

4. The method of claim 1, further comprising:
at the first device that is part of the first portion of the ad hoc network,
   determining, from the first set of addresses, a subset of addresses that are not locally stored at the second device;
   determining, from the second set of addresses, a subset of addresses that are not locally stored at the first device;
   transmitting, to the second device, the subset of addresses from the locally stored first set of addresses that are not locally stored at the second device; and
   transmitting, to other devices of the first portion of the ad hoc network, the subset of addresses from the second set of addresses that are not locally stored at the first device.

5. The method of claim 1, further comprising:
at the first device that is part of the first portion of the ad hoc network,
   determining a conflicting address belonging to a third device of the first portion of the ad hoc network, and to a fourth device of the second portion of the ad hoc network;
   in response to said determining the conflicting address, assigning a new address to the third device; and
   notifying other devices of the first portion of the ad hoc network of the newly assigned address of the third device.

6. The method of claim 1, further comprising:
at a given device that is a member of the ad hoc network,
   receiving a request to join the ad hoc network from a device that is not a member of the ad hoc network;
   transmitting to the requesting device a locally stored set of addresses associated with the ad hoc network;
   obtaining an address for the requesting device to be different from any address of the locally stored set of addresses, thereby making the requesting device a newest member associated with the ad hoc network; and
   notifying other devices associated with the ad hoc network about the address of the newest member associated with the ad hoc network.

7. The method of claim 6, wherein
said obtaining the address for the requesting device comprises assigning an address for the requesting device, and
the method further comprises transmitting the assigned address to the requesting device.

8. The method of claim 6, wherein said obtaining the address for the requesting device comprises receiving, from the requesting device, a self-assigned address.

9. A device comprising:
one or more hardware processors; and
a memory storing instructions that, when executed by the one or more hardware processors, cause the device to perform operations comprising:
   communicating with one or more members of a first portion of an ad hoc network that includes the device;
   receiving, from a second device that is part of a second portion of the ad hoc network, information relating to a second set of addresses associated with the ad hoc network, the second set of addresses being locally stored at the second device, and the first and second portions of the ad hoc network having been disconnected prior to said receiving the information relating to the second set of addresses;
   determining that the second set of addresses is different from a first set of addresses associated with the ad hoc network, the first set of addresses being locally stored at the device;
   in response to the determination, requesting from the second device the second set of addresses;
   receiving a response from the second device including the second set of addresses; and
   generating a set of addresses associated with the coalesced first and second portions of the ad hoc network as a reunion of the first and second sets of addresses.

10. The device of claim 9, wherein
the ad hoc network is a wireless ad hoc network, and
the operations further comprise beaconing information relating to the set of addresses associated with the coalesced first and second portions of the ad hoc network.

11. The device of claim 9, wherein
the ad hoc network is a wireless ad hoc network, and
the information relating to the second set of addresses is received by the device via a beacon carrying the information that was emitted by the second device.

12. The device of claim 9, wherein the operations further comprise:
   determining, from the first set of addresses, a subset of addresses that are not locally stored at the second device;
   determining, from the second set of addresses, a subset of addresses that are not locally stored at the device;
   transmitting, to the second device, the subset of addresses from the locally stored first set of addresses that are not locally stored at the second device; and
   transmitting, to other devices of the first portion of the ad hoc network, the subset of addresses from the second set of addresses that are not locally stored at the device.

13. The device of claim 9, wherein the operations further comprise:

determining a conflicting address belonging to a third device of the first portion of the ad hoc network, and to a fourth device of the second portion of the ad hoc network;

in response to said determining the conflicting address, assigning a new address to the third device; and notifying other devices of the first portion of the ad hoc network of the newly assigned address of the third device.

14. The device of claim 9, wherein the operations further comprise:

receiving a request to join the ad hoc network from a device that is not a member of the ad hoc network;

transmitting to the requesting device a locally stored set of addresses associated with the ad hoc network;

obtaining an address for the requesting device to be different from any address of the locally stored set of addresses, thereby making the requesting device a newest member associated with the ad hoc network; and notifying other devices associated with the ad hoc network about the address of the newest member associated with the ad hoc network.

15. The device of claim 14, wherein the operation of obtaining the address for the requesting device comprises assigning an address for the requesting device, and the operations further comprise transmitting the assigned address to the requesting device.

16. The device of claim 14, wherein the operation of obtaining the address for the requesting device comprises receiving, from the requesting device, a self-assigned address.

* * * * *